United States Patent [19]

Kittilä

[11] Patent Number: 4,846,261

[45] Date of Patent: Jul. 11, 1989

[54] VACUUM HEAT EXCHANGE APPARATUS FOR VENTILATION OF BUILDINGS, IN PARTICULARLY OF ANIMAL SHEDS

[75] Inventor: Ilmari Kittilä, Turku, Finland

[73] Assignee: Karjasuo Oy, Kaarina, Finland

[21] Appl. No.: 122,110

[22] Filed: Nov. 18, 1987

[51] Int. Cl.⁴ .................... F24H 3/02; F01D 1/04; F01D 5/00

[52] U.S. Cl. .................... 165/54; 98/33.1; 415/77; 416/131; 416/193 R

[58] Field of Search .......... 165/54, 909; 415/77, 415/78, 85, 61; 416/131, 193 R; 417/315; 98/33.1

[56] References Cited

U.S. PATENT DOCUMENTS

| | | | |
|---|---|---|---|
| 2,257,976 | 10/1941 | Moorman | 416/131 R |
| 2,488,333 | 11/1949 | Schlachter | 165/54 |
| 2,790,596 | 4/1957 | Stirling | 416/193 R |
| 3,122,307 | 2/1964 | Wasson et al. | 98/33.1 |
| 3,143,283 | 8/1964 | Downs | 415/77 |
| 3,199,773 | 8/1965 | Stirling | 415/77 |
| 3,202,342 | 8/1965 | Wasson et al. | 98/33.1 |
| 3,487,767 | 7/1970 | Kristiansen | 415/77 |
| 3,499,378 | 3/1970 | Baumann et al. | 98/33.1 |
| 3,557,681 | 1/1971 | Kristiansen | 98/33.1 |
| 3,635,589 | 1/1972 | Kristiansen | 416/193 |

FOREIGN PATENT DOCUMENTS

| | | | |
|---|---|---|---|
| 470100 | 12/1950 | Canada | 165/54 |
| 92384 | 5/1896 | Fed. Rep. of Germany | 416/131 R |
| 43122 | 5/1960 | Poland | 165/54 |
| 1028958 | 7/1983 | U.S.S.R. | 98/33.1 |
| 571513 | 8/1945 | United Kingdom | 98/33.1 |
| 1579493 | 11/1980 | United Kingdom | 416/131 R |

*Primary Examiner*—Albert W. Davis, Jr.
*Assistant Examiner*—John K. Ford
*Attorney, Agent, or Firm*—Herbert Dubno

[57] ABSTRACT

The present invention relates to a heat exchange machine for removing the excess of the heat during the summer period and the excess of humidity during the cold period. The machine comprises two tubes, one inside the other, an intermediate frame with two sets of blades attached to the frame from inside and outside thereof and driven by a common reversible motor in the same direction. One of these sets is the set of blades rigidly fixed to and the other one is swingingly mounted in the frame, so that the change of the direction of the fixed set of blades induces the change of the direction of the air flow in one of the tubes, meanwhile the direction of the air flow along the other tube induced by the other set of swingable blades remains the same regardless of the direction of rotation of this set.

7 Claims, 5 Drawing Sheets

4,846,261

VACUUM HEAT EXCHANGE APPARATUS FOR VENTILATION OF BUILDINGS, IN PARTICULARLY OF ANIMAL SHEDS

FIELD OF THE INVENTION

My present invention relates to a ventilation apparatus for cattle sheds;

Particularly in cattle sheds, a ventilation system is required which is capable of removing excess heat during the warm season and excess humidity during the cold season.

Excess heat is most conveniently removed by a vacuum fan, since it can transfer large quantities of air with a minimal power consumption. To decrease humidity, a heat exchanger can be used as follows: the cold air drawn in is warmed by the moist discharged air. Thus, the need for ventilation is low enough to permit the use of a low-effect vacuum fan. On the other hand, sufficient heating is obtained in Southern and Central Finland, if the air drawn in is heated by one fourth of the temperature difference between the indoor and outdoor air; e.g. if the temperature difference is 40° C., a heating of 10° C. suffices.

It is known that in cattle shed ventilation, fans with propeller blades divided radially into two sections operative in the inner and outer channels are used. It is also known that the propeller blade pitches can be altered independently of each other in the inner and outer channels.

The ventilation effect of this type of fan is regulated by altering the propeller blade pitch. The regulator mechanism is, however, rather complicated and costly. It is considerably easier to regulate the fan by altering the fan - motor driving voltage at constant propeller blade pitch. In addition, provided that the pitch of the propeller blades can be reversed so that the air flows in the opposite direction, such a device can be used as a heat exchanger. However, in case of adjustable pitch fans, the system regulating the pitch is extremely complicated.

OBJECT OF THE INVENTION

It is an object of the invention to eliminate these drawbacks.

BRIEF DESCRIPTION OF THE DRAWING

The above and other objects of the present invention will become more apparent from the following description, reference being made to the accompanying drawing in which.

Figure 1:
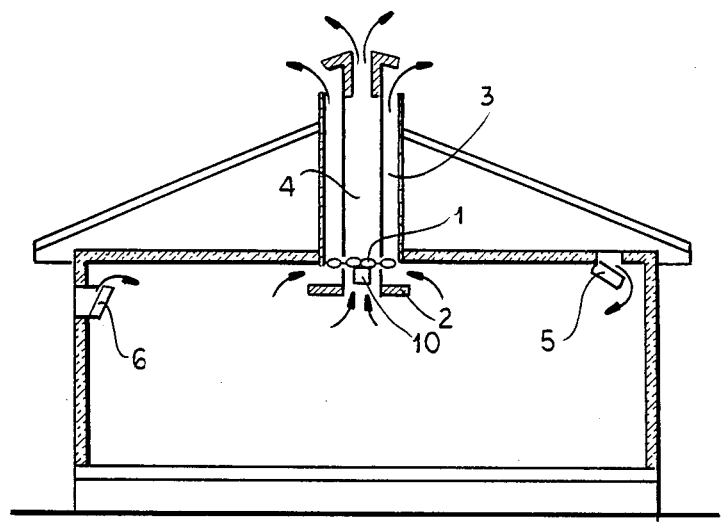
FIG. 1 is a diagrammatic view of the low pressure ventilation system without a heat exchanger shown by the Prior Art.
Figure 2:
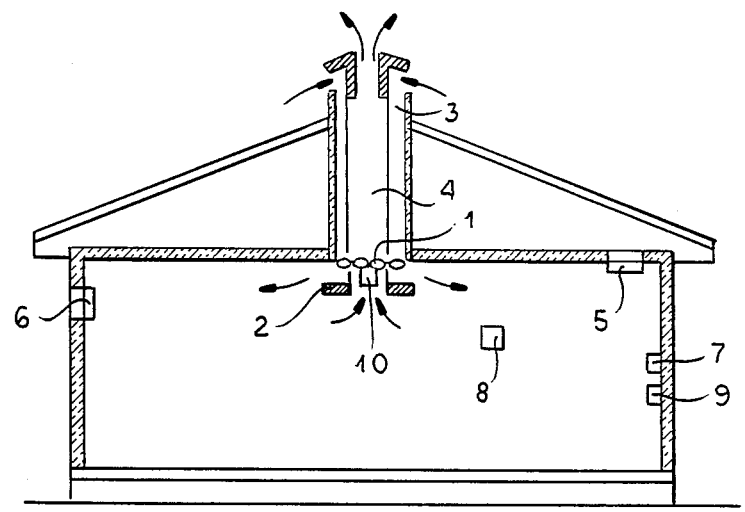
FIG. 2 is a conventional low pressure ventilation system equipped with a heat exchanger of the Prior Art.
Figure 4:
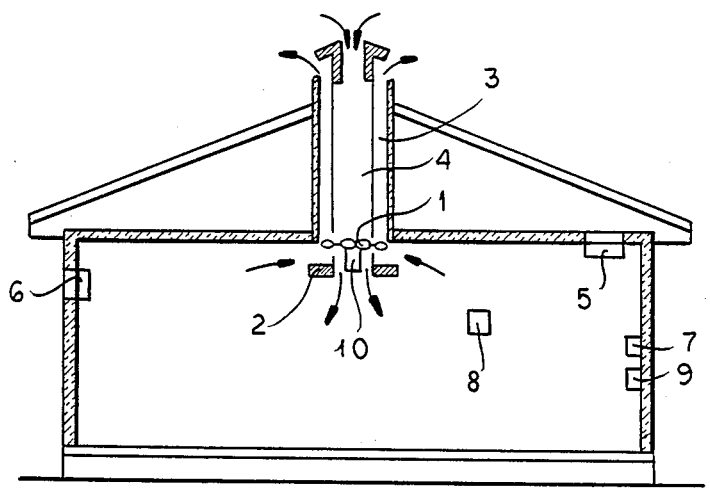
FIG. 4 is a diagrammatic view of the ventilation/heat exchanger system of the current invention.

The control axes 12 of the reversible blades 13 are located at the lower edges of the blades 13, the edges being nearly in alignment with the radius. Thus, these blades always cause a flow of air in channel 4 from below upwards, or from inside out, regardless of the direction of rotation of motor 10. Since the blades 14 are fixed, the direction of air flow is reversed in channel 3, when the rotation direction of the motor 10 or fan is changed. Thus the fan described in the invention as illustrated in FIG. 4 changes from a vacuum fan as illustrated in FIG. 1 into a heat exchanger as illustrated in FIG. 2 by only reversing the rotation direction of the motor 10 and the fan.

In case it is desirable to keep constant the direction of flow in the outer channel 3, from inside out, the reversible blades are mounted on the outer side of the intermediate frame and the fixed blades on the inside of this frame. When the rotation direction of the motor 10 is changed, the vacuum fan system thus operates according to the principle illustrated in FIG. 1 with the air flow in the outer channel 4 directed from inside out, and the heat exchanger system operates according to the principle illustrated in FIG. 2 with the air flow in channel 4 directed from outside in FIG. 2 with the air flow in channel 4 directed from outside in.

It is obvious that the reversible blades can be mounted on the inside/outside of the intermediate frame and the fixed blades mounted on the outside/inside.

Figure 3A:
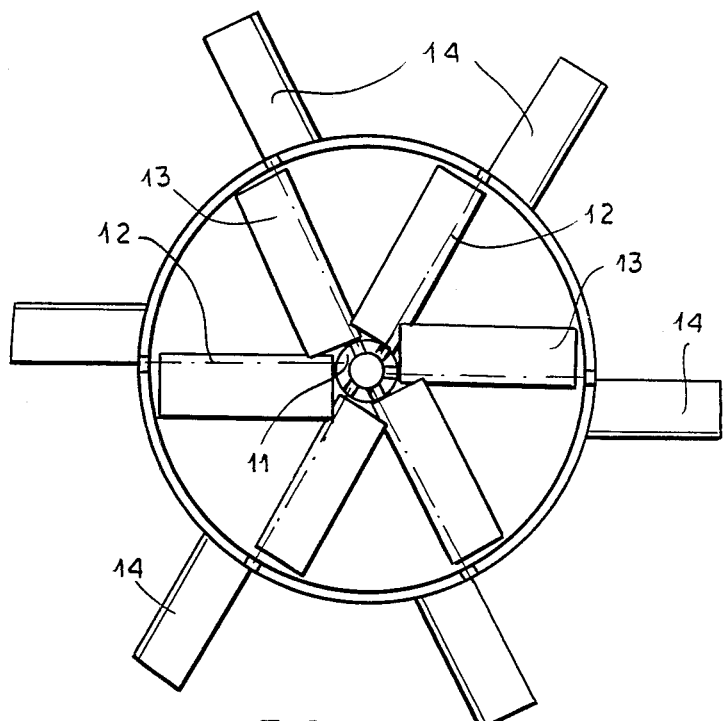
FIGS. 3A and 3B are plan and sectional views of the fan rotor hub according to the present invention.
Figure 3B:
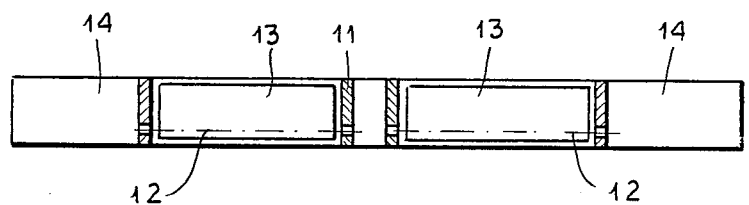

A vacuum fan and/or heat exchanger to remove excess heat/humidity primarily from cattle sheds. The rotor (1) in FIGS. 3A and 3B has fixed blades (14) on the outside of a frame at a specified radius, and reversible blades (13) between the hub and intermediate frame.

Figure 5A:
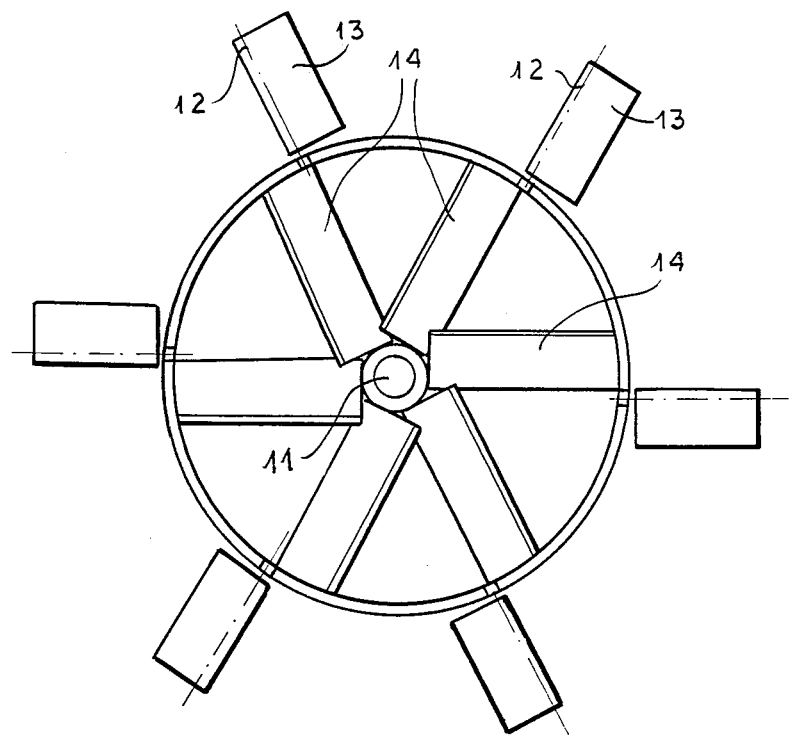
FIGS. 5A, and 5B are plan and sectional views of another embodiment of the fan rotor hub of the present invention.
Figure 5B:
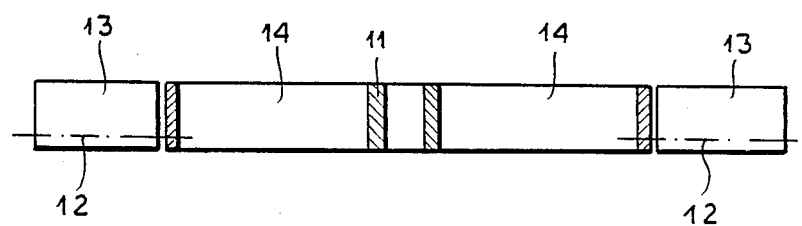

Thus, the device operates as a vacuum fan when the rotor (1) rotates in one direction, the pitch of the blades (13 and 14) being aligned, and as a heat exchanger when the rotational direction of the rotor (1) is reversed, and the pitch of the inner blades (13) is different from that of the outer blades (14). In this case, the fixed blades (14) blow in air through the outermost channels, and the reversible blades (13) suck the air out from indoors through the innermost channel (4). The reversible blades (13) mounted on the inner frame are mounted in bearings (15), on one of their edges (12) which is close to radial so that they always cause the air to flow in the same direction, regardless of whether the rotor direction (1) is reversed. The reversible blades can also be located on the outside of the intermediate frame and the fixed blades on the inside as shown in FIGS. 5A and 5B.

What I claim is:

1. An evacuation vacuum heat exchanging apparatus for ventilation of buildings, in particularly of animal sheds, comprising:
   air discharge means provided with a first and a second discharge channels located one inside the other for connecting the interior of the building with the atmosphere; and
   an evacuation vacuum machine juxtaposed with said discharge means in the building, comprising
   a reversible hub rotatable about an axis of rotation,
   an intermediate frame coaxial with said hub, said frame having two opposite sides spaced radially from said hub,
   a first set of blades rigidly mounted on one side of said frame and driven by said hub, said first set blowing the air flow along said first channel,
   a second set of blades mounted on the other side of said frame and driven by said hub, and means for mounting said second set of blades, each of the blades of said second set being freely pivotable about a respective axis extending radially to said axis of rotation, so that said first set of the rigidly mounted blades alters a direction of the air flow upon changing a rotation of said hub in said first discharge channel, while the second set moving the air flow along the second discharge channel maintains a constant direction of said air flow regardless of said rotation of said hub by swinging the blades about the respective axes as forced by the air flow.

2. The apparatus defined in claim 1 wherein said first set of the blades is mounted between said intermediate frame and the hub.

3. The apparatus defined in claim 1 wherein said discharge means comprise two tubes forming said first and second channels.

4. The apparatus defined in claim 1 wherein said means for mounting said second set of blades are bearings.

5. The apparatus defined in claim 1 wherein said second set of the blades is mounted between the intermediate frame and the hub.

6. The apparatus defined in claim 4 wherein each of said blades of the second set has a respective edge mounted in the respective bearing, the other edge of the respective blade is swingable about said respective edge.

7. The apparatus defined in claim 6 wherein said respective edge of the respective blade of the second set is a leading edge regardless of a direction of the rotation of said hub.

* * * * *